United States Patent Office 3,429,816
Patented Feb. 25, 1969

3,429,816
THERMOSTABLE MIXTURES OF DIPHENOXY-
BENZENES AND MONO- AND DIPHENOXYDI-
PHENYLS USABLE AS FUNCTIONAL LIQUIDS
François Giolito and Jean Philippe, Lyon, France, assignors to Progil, Paris, France, a corporation of France
No Drawing. Filed Aug. 12, 1966, Ser. No. 571,993
Claims priority, application France, Sept. 1, 1965, 46,350
U.S. Cl. 252—52    9 Claims
Int. Cl. C10m 3/14; C09 3/02

ABSTRACT OF THE DISCLOSURE

Compositions are provided usable as lubricants, heat transfer agents and hydraulic fluids. Such compositions consist essentially of a mixture of diphenoxybenzenes, monophenoxydiphenyls or diphenoxydiphenyls and may also include ortho or meta terphenyl.

---

The present invention relates to compositions which contain essentially diphenoxybenzenes and phenoxydiphenyls, which have an excellent thermal stability and are, for that reason, excellent transmision fluids. It has also for object the new industrial products represented by these compositions.

It is known that industry has an increasing need of liquid substances which remain stable for long periods at temperatures of up to 300° to 400° C. in order to be used as functional or lubricating fluids working at high temperatures.

Among the numerous substances previously recommended for this purpose, are either mono- and/or polyphenoxybenzenes or mono- and/or polyphenoxydiphenyls (U.S. Patent 2,095,619, Chemical and Metallurgical Engineering, vol. 39, pp. 213–216 (1963); Chemistry and Industry, Aug. 29, 1959, pp. 1090–1).

However these products are not always usable as transmission fluids over a large temperature range, because many of them are solid at room temperature, their melting points varying frequently between 30 and 70° C. In addition, their thermal stability at high temperatures, i.e. 300° C. and more, is not entirely satisfactory and it is common to add stabilizing agents such as, for example, organo-metallic compounds, diketone metal chelates, sulfurized hetero-cyclic compounds, etc.

It has now been found that certain mixtures of these compounds yield compositions which remain liquid over a large temperature range and also have excellent thermal stability.

The compositions according to the present invention are mixtures containing at least one of the ortho, meta or para-isomers of diphenoxybenzenes, at least a compound chosen from the class of mono- and/or diphenoxy-diphenyls, and possibly the ortho and/or meta-isomers of terphenyl.

These mixtures according to the present invention remain in the liquid state over a very large temperature range, generally between 0° C. and 375° C. Moreover they are thermally stable between these limits. Some of these mixtures remain in a liquid state even at temperatures lower than 0° C., especially those which contain several phenoxydiphenyl isomers (mixtures of mono- and diphenoxy) and at least one diphenoxybenzene isomer. These characteristics, plus a good oxidation resistance at high temperatures, make the mixtures according to the present invention especially suitable to be used as hydraulic liquids, heat transfer agents, mechanical transmission media and lubricants submitted to severe working conditions.

The constituents of the composition according to the invention are known chemical products which may be prepared according to classical methods. To obtain, for example, the different isomers of diphenoxybenzenes or mono- and/or diphenoxydiphenyls, one of the best processes consists of reacting potassium phenate respectively with dichlorobenzenes or mono- or dichlorodiphenyls, in the presence of copper as a catalyst and at a temperature of 280–320° C. After destruction of the excess alkaline phenate, the organic phase is distilled then rectified in order to obtain the different desired isomers. However it is recommended that a maximum amount of the intermediary chlorophenoxylated products be removed, as the chlorine contents in the constituents according to the invention, must be preferably lower than 100 parts per million.

The terphenyls may also be prepared according to conventional techniques, especially the pyrolysis of a vapor mixture of 70 to 80% benzene and 30 to 20% diphenyl at a temperature of 700 to 750° C., with heating times of 10 and 50 seconds.

The respective ratios of the various compounds of the mixtures according to the invention may vary between large limits. By indicating as (a) the whole of diphenoxybenzenes, (b) the mono- and/or diphenoxydiphenyls, and (c) the terphenyls, it is possible to say that especially interesting results are obtained with the following preferential ratios.

Binary mixtures: 1 to 60 parts of (a) and 99 to 40 parts of (b) for 100 parts by weight of (a)+(b).

Ternary mixtures: it is possible to add 1 to 40 parts of (c) to 100 parts of the binary mixtures hereinabove.

The following examples, quoted in a nonlimitative way, illustrate a number of compositions according to the present invention, with an indication of the respective ratios of each of the constituents and/or isomers. The examples also make quite clear the interesting characteristics of several of the mixtures for use in the hydraulic fluid field.

EXAMPLE 1

Compositions which were true liquids at room temperature (25° C.) and thermally stable between 25 and 375° C. for more than 300 hours, without the addition of a stabilizing agent or anti-oxidant, were obtained by effecting the mixtures given in Table 1 hereinunder, in which the indicated figures correspond, on every horizontal line, to parts by weight for 100 parts of the whole composition.

TABLE 1

| Mixture No. | Phenoxy-diphenyls | | | Diphenoxybenzenes | | | Terphenyls | |
|---|---|---|---|---|---|---|---|---|
| | 2-phenoxy | 4-phenoxy | 2,2'-diphenoxy | Ortho | Meta | Para | Ortho | Meta |
| 1 | 34.2 | 18 | 7.8 | | 40 | | | |
| 2 | 50.4 | 18.9 | 20.7 | | | 10 | | |
| 3 | 44.8 | 16.8 | 18.4 | | | 20 | | |
| 4 | 30 | 12 | 12 | | 27 | 9 | 10 | |
| 5 | 35 | 25 | | | 30 | 10 | | |
| 6 | 35 | 25 | | 5.2 | 24.8 | 14 | | |
| 7 | 28.5 | 15 | 6.5 | | 40 | | 7 | 3 |
| 8 | 37.24 | 13.96 | 15.3 | 9.12 | 5 | 19.38 | | |
| 9 | 31.36 | 11.76 | 12.88 | 7.68 | 20 | 16.32 | | |
| 10 | 30 | 20 | 10 | 5 | 35 | | | |
| 11 | 48 | 17 | 20 | | | 15 | | |
| 12 | 42.9 | 16.0 | 17.6 | | 10 | 13.5 | | |
| 13 | 38.0 | 14.3 | 15.6 | | 20 | 12 | | |

EXAMPLE 2

Table 2 hereafter discloses, in a non limitative way, some other compositions, corresponding to the mixtures $(a)+(b)$ according to the invention, which have the great advantage of being liquid at temperatures lower than 0° C. The test has been made at −5° C. after recrystallizing the constituents after more or less long stays at between −40 and −5° C., in order to avoid superfusion phenomenon.

TABLE 2

| Mixture No. | Phenoxy-diphenyls [1] | | | Diphenoxybenzenes [1] | | |
|---|---|---|---|---|---|---|
| | 2-phenoxy | 4-phenoxy | 2,2'-diphenoxy | Ortho | Meta | Para |
| 14 | 35.9 | 18.9 | 8.2 | 9 | 10 | 18 |
| 15 | 31.9 | 16.8 | 7.3 | 8 | 20 | 16 |
| 16 | 27.9 | 14.7 | 6.4 | 7 | 30 | 14 |
| 17 | 39.2 | 14.7 | 16.1 | | 30 | |
| 18 | 33.6 | 12.6 | 13.8 | | 40 | |
| 19 | 27.44 | 10.29 | 11.27 | 6.72 | 30 | 14.28 |
| 20 | 33.3 | 12.5 | 13.7 | | 30 | 10.5 |

[1] Parts by weight for 100 parts of the whole mixture.

It will be noted especially that the addition of the sole meta-isomer of diphenoxybenzene to mixtures of mono- and diphenoxydiphenyls yields very fluid compositions at a temperature lower than 0° C. Moreover it may be seen, in comparing the tests 12 and 13 of the Table 1 with the test 20 of the Table 2, that increasing additions of meta-diphenoxybenzene are especially interesting for decreasing the viscosity of mono- and diphenoxybenzene mixtures, already liquid at room temperature. The viscosities (expressed in centistokes) go from 103 for the composition of mixture 12 to 86.5 for mixture 13, and 70.1 for mixture 20.

EXAMPLE 3

For studing the thermal stability of the composition entering the field of the mixtures according to the invention, pyrolysis tests in ampules have been made in the following way:

The mixtures to be studied (liquid samples of 20 to 25 gr.) were introduced in Pyrex glass ampules of a volume of about 50 ml. able to bear pressures of 10 atmospheres at 400° C. After degassing of the mixture, under vacuum, and closing of the ampules, they are placed in the pits of a multicellular electrical oven and brought to the desired temperature for about 500 hours. Moreover there has been introduced in some ampules, samples of various metals, such as especially, iron and copper, or still gaseous or liquid impurities such as oxygen, water, chlorinated products, etc. in order to determine the influence of these parameters on the pyrolytic decomposition of the studied fluids.

Then after a heating time of 500 hours at a temperature of 380° C. for all the samples, the following characteristic measurements have been made:

(a) Measurement of the quantity of the formed gas, in ml. per gr. of mixture (referred to normal conditions of temperature and pressure).

(b) Measurement of the quantity of the formed products, lighter and heavier than the starting products, through the microdistillation, under standard conditions, of 1 gr. of product, that is:

Light—Products distilling in 30 minutes, under 0.1 mm. Hg at 100° C.

Heavy—Boiler residues after an ascent of temperature from 100 to 210° during 2 hours, then maintenance of this temperature for 30 minutes under 0.1 mm. Hg.

(e) Possibly, determinations, after pyrolysis, of phenol in a zone which is such that this viscosity is normally able to develop very much.

(d) Change of sample aspects: measurement of weight variation corrosion study.

(e) Possibly, detemination, after pyrolysis, of phenol functions, metal traces, halogen contents, etc.

Testing was conducted under the above conditions, on the following binary composition (percent by weight):

Phenoxy-diphenyls— Percent
    2-phenoxy _____ 35
    4-phenoxy _____ 14
    2,2'-diphenoxy _____ 21
Diphenoxybenzene—
    Meta isomer _____ 30

The results given in Table 3 hereafter have been obtained:

TABLE 3

| Analysis results | Atmosphere or impurities in sample ampules | | | | |
|---|---|---|---|---|---|
| | Vacuum | Oxygen (100 mm. Hg) | Iron[1] | Copper[1] | Iron+copper +oxygen (100 mm. Hg) |
| Formed gases (ml./gr.) | 0.16 | | 0.17 | 0.19 | |
| Light formed products (percent weight) | 0.3 | 0.85 | 0.5 | 1 | 0.85 |
| Heavy formed products (percent weight) | 1.4 | 1.3 | 0.9 | 2.0 | 1.3 |
| Corrosion | | | Null | Null | Null |
| Phenols, percent | 0.7 | 0.66 | 0.67 | 0.65 | 0.66 |

[1] Dimensions of metal samples: 60 x 15 x 1.5 (mm.).

Tests were also conducted under the same conditions as previously, but with the following mixture (percents by weight):

Phenoxy-diphenyls— Percent
    2-phenoxy _____ 43.4
    3-phenoxy _____ 2.6
    4-phenoxy _____ 18.0
    2,2'-diphenoxy _____ 21.0
Diphenoxybenzene—
    Para isomer _____ 15.0

After pyrolysis the characteristics of viscosity at 100° ($\eta$ 100) and of weight variation ($\Delta p$) given in Table 4 were obtained.

TABLE 4

| Mixture results | Atmosphere or impurities in sample ampules | | | | |
|---|---|---|---|---|---|
| | Vacuum | Iron | Copper | Oxygen (100 mm. Hg) | Iron+copper +oxygen (100 mm. Hg) |
| Δ 100 | 4.78 | 4.81 | 4.68 | 4.72 | 4.77 |
| Δp (mg./cm.²) | | ≤+0.01 | ≤+0.01 | | Fe:0.13 Cu≤+0.01 |

EXAMPLE 4

In order to utilize test conditions closer to real use conditions of transmission fluids, pyrolysis tests were made in microloops in stainless steel, in the following way:

The fluids to be studied were placed in small loops of 75 to 80 ml. made with stainless steel tube of a diameter of 8 x 13 (mm.) and pyrolysis was conducted by electrically heating the upper half of the loops.

The following mixture was pyrolysed for 500 hours at 380–420° C. under an autogenous pressure of between 0.7 and 1.5 atmospheres:

Phenoxydiphenyls— Percent by weight
  2-phenoxy _____ 42.7
  3-phenoxy _____ 2.3
  4-phenoxy _____ 16.0
  2,2'-diphenoxy _____ 17.0
Diphenoxybenzenes—
  Ortho isomer _____ 7.0
  Para isomer _____ 13.0

It was found that the pyrolysed product kept all its fluidity, after return to room temperature and that its composition remained stable during the test. The analysis has shown phenol traces, obtained by decomposition, lower than 1.5%.

The results previously mentioned in Examples 3 and 4 show clearly that the mixtures according to the present invention are stable enough thermally to be able to be used successfully as heat transfer fluids in a large range of temperatures, especially between 0 and 375° C. From 400° C. these fluids decompose very slightly and tests have shown that this decomposition is not sudden, even at a temperature of 420° C. for 500 hours. On the other hand the traces of degradation products are soluble in the starting mixtures and the phenomenon of a sudden carbonization is not observed.

The addition of terphenyl isomers to phenoxy-diphenyl and diphenoxy-benzene mixtures, according to one embodiment of the invention, does not disturb the thermal stability since terphenyls are themselves very stable to temperatures of about 400° C.

What is claimed is:

1. A composition of matter useful as a lubricant, heat transfer agent or hydraulic fluid, comprising a mixture which consists essentially of 1 to 60 parts by weight of (a) diphenoxybenzenes and 99 to 40 parts by weight of at least one compound (b) selected from the group consisting of the monophenoxydiphenyls, the diphenoxydiphenyls and mixtures thereof.

2. A composition in accordance with claim 1 wherein said diphenoxybenzenes consist essentially of the meta-isomer.

3. A method of lubricating surfaces working at high temperatures which comprises lubricating said surfaces with a composition according to claim 1.

4. A method of transferring heat in a temperature range of 0–375° C. comprising placing a composition of matter according to claim 1 into contact with a heated surface.

5. A method of transmitting mechanical forces comprising placing a composition of matter according to claim 1 between the part imparting mechanical force and the part to which the mechanical force is to be transmitted.

6. A composition of matter according to claim 1, which contains additionally up to 40 parts by weight of at least one compound selected from the group consisting of ortho- and meta-terphenyl, for each 100 parts of the mixture of (a)+(b).

7. A method of lubricating surfaces working at high temperatures which comprises lubricating said surfaces with a composition according to claim 6.

8. A method of transferring heat in a temperature range of 0–375° C. comprising placing a composition of matter according to claim 6 into contact with a heated surface.

9. A method of transmitting mechanical forces comprising placing a composition of matter according to claim 6 between the part imparting mechanical force and the part to which the mechanical force is to be transmitted.

References Cited

UNITED STATES PATENTS

| 1,882,809 | 10/1932 | Grebe | 252—52 XR |
| 1,976,468 | 10/1934 | Williams | 260—670 |
| 2,095,619 | 10/1937 | Stoesser et al. | 252—73 XR |
| 2,149,789 | 3/1939 | Rittler et al. | 252—73 |
| 3,006,852 | 10/1961 | Barnum et al. | 252—52 |
| 3,080,321 | 3/1963 | Blake et al. | 252—52 XR |
| 3,081,355 | 3/1963 | Johnson | 252—52 XR |
| 3,265,753 | 8/1966 | Goeb | 260—670 XR |

OTHER REFERENCES

Seymour: "Organic Compounds for Industrial Heating," Chemical Age, vol. 43 (1940), pp. 43 and 44.

DANIEL E. WYMAN, *Primary Examiner.*

W. H. CANNON, *Assistant Examiner.*

U.S. Cl. X.R.

252—59, 73